United States Patent [19]

Pourchon et al.

[11] Patent Number: 4,886,290

[45] Date of Patent: Dec. 12, 1989

[54] DEVICE MAKING IT POSSIBLE TO LOWER THE REAR OF A ROAD VEHICLE TO BRING IT TO GROUND LEVEL

[75] Inventors: Andre Pourchon, Ecully; Dominique Guinamard, Lozzane, both of France

[73] Assignee: Societe Industrielle de Prefabrication Electrique, Lozanne, France

[21] Appl. No.: 278,108

[22] Filed: Nov. 30, 1988

[30] Foreign Application Priority Data

Nov. 30, 1987 [FR] France ................................ 87 16927

[51] Int. Cl.[4] ................................................ B60G 25/00

[52] U.S. Cl. .................................. 280/704; 280/414.5

[58] Field of Search .............................. 200/704, 414.5

[56] References Cited

U.S. PATENT DOCUMENTS 3,001,796 9/1961 Martin ................................ 280/704

3,831,210 8/1974 Ow ...................................... 280/704

FOREIGN PATENT DOCUMENTS 1551769 8/1979 United Kingdom ................ 280/704

2134052 8/1984 United Kingdom ................ 280/704

*Primary Examiner*—Kenneth R. Rice

*Attorney, Agent, or Firm*—Browdy and Neimark

[57] ABSTRACT

The device includes, at each end of rear axle, an approximately vertical beam, whose lower end is fastened to the axle, and in which is mounted, with insertion of a bearing; a shaft passing through the beam, oriented parallel to the axle, to whose outside end is fastened a first arm on which is mounted the steering knuckle and wheel hub unit and, to whose inside end is fastened a second arm equipped with an assembly for locking in road position, a roller for supporting the vehicle rear on frame in the lowered position and on which is pivoted the end of a rod of a cylinder whose body is pivoted close to the upper end of beam. The shaft carrying the two arms and the pivot pin of cylinder on the second arm is offset lengthwise relative to the wheel axis. The present invention has application to equipping vehicles with front-wheel drive and rigid rear axle with blade suspension.

8 Claims, 2 Drawing Sheets

DEVICE MAKING IT POSSIBLE TO LOWER THE REAR OF A ROAD VEHICLE TO BRING IT TO GROUND LEVEL

BACKGROUND OF THE INVENTION

1. Field of the Invention

The present invention relates to a device making it possible to lower the rear of a road vehicle to bring it to ground level, and more particularly a device intended to equip a vehicle with front-wheel drive and comprising a rigid rear axle with blade suspension.

2. The Prior Art

The vehicles involved more particularly are small utility vehicles used as vans for transporting goods and as small public transportation vehicles. Such vehicles are very often equipped to transport handicapped persons using wheelchairs, which requires specific equipment to allow loading and unloading of the wheelchairs and their occupants.

SUMMARY OF THE INVENTION

According to the present invention one solution involves making it possible to lower the rear of the vehicle to bring it to ground level.

The device according to the invention comprises, at each end of the rear axle, an approximately vertical beam, whose lower end is fastened to the axle, and in which is mounted, with insertion of a bearing, a shaft passing through the beam, oriented parallel to the axle. A first arm is fastened to an outside end of the shaft on which is mounted steering knuckle and wheel hub unit and a second arm is fastened to an inside of the shaft and is equipped with means for locking in road position and means for supporting the vehicle rear on the frame in the lowered position. The end of a rod of a cylinder is pivoted on the second arm. The cylinder has a body which is pivoted close to the upper end of the beam. The shaft which carries the two arms and pivot pin of the cylinder on the second arm is offset lengthwise relative to the wheel axis.

When the vehicle is in a road position, the second arm is locked relative to the vertical beam, so that neither the two arms nor the shaft to Which they are fastened can pivot relative to the wheel axis.

To lower the rear of the vehicle, first the second arm is unlocked, which, considering the longitudinal offset of the shaft carrying the two arms relative to the wheel axis, makes possible a lowering of the rear of the vehicle under the action merely of its weight, until the stop means, with which the second arm is equipped, come to rest on the frame.

In a second period, the cylinder is fed in the extension direction of its rod, which assures pivoting of the unit of the arms by rotation around the wheel axis in the direction of lowering the rear of the vehicle, by compression of the suspension, with simultaneous pivoting of the carrying shaft.

To bring the rear of the vehicle into high position, it suffices to operate the cylinder in the retraction direction of its rod, making possible pivoting of the arms relative to the wheel axis until locking of the second arm, the arms on the inside of the bearing mounted in the vertical beam.

Advantageously, the wheel axis, the shaft carrying the two arms and the pivot pin of the cylinder rod on the second arm are approximately aligned, the shaft carrying the two arms being placed between the pivot pin and wheel axis.

According to another characteristic of the invention, the means for locking the second arm consist, in combination, of a recess in the form of a hook made in the second arm and open on the side of the pivot pin of the cylinder rod, and of a pin with an axis parallel to that of the axle, solid with a latch to pivot on the beam around a pin also parallel to the wheel axis.

Advantageously, the means for controlling the latch consists of a hydraulic cylinder assuring the pivoting of the latch around its pin in the direction of release of the locking pin from the recess of the second arm.

According to another characteristic of the invention, the means for support of the second arm on the frame consist of a roller mounted on the second arm, with an axis parallel to the axle, placed behind the pin of the cylinder rod in the direction of rotation of the arms corresponding to the extension of the cylinder rod.

The edge of the second arm, located behind the hook-shaped recess, in the direction of rotation of the arms corresponding to the extension of the cylinder rod, has a cam-shaped convex profile. During mounting on the vehicle frame, this profile allows the second arm to rest on the locking pin and guides the latter until it falls in the hook-shaped recess.

Advantageously, the hydraulic circuit for feeding the cylinder is equipped with a check valve preventing escape of the fluid from the upper chamber of the cylinder which the vehicle frame is in low position.

Thus, it is possible to maintain the vehicle in lowered position with making the hydraulic unit operate.

Preferably, each beam is equipped with a stop made of a flexible, damping material such as rubber, on which the second arm rests when the vehicle is in the road position. This stop is normally compressed by the second arm to cancel any play and to absorb the weight of the wheel under consideration when it goes through a hole.

BRIEF DESCRIPTION OF THE DRAWINGS

In any case, the invention will be better understood with the help of the following description, with reference to the accompanying diagrammatic drawings, representing by way of nonlimiting example, an embodiment of this device, in which.

DETAILED DESCRIPTION OF THE PREFERRED EMBODIMENT

Figure 2:
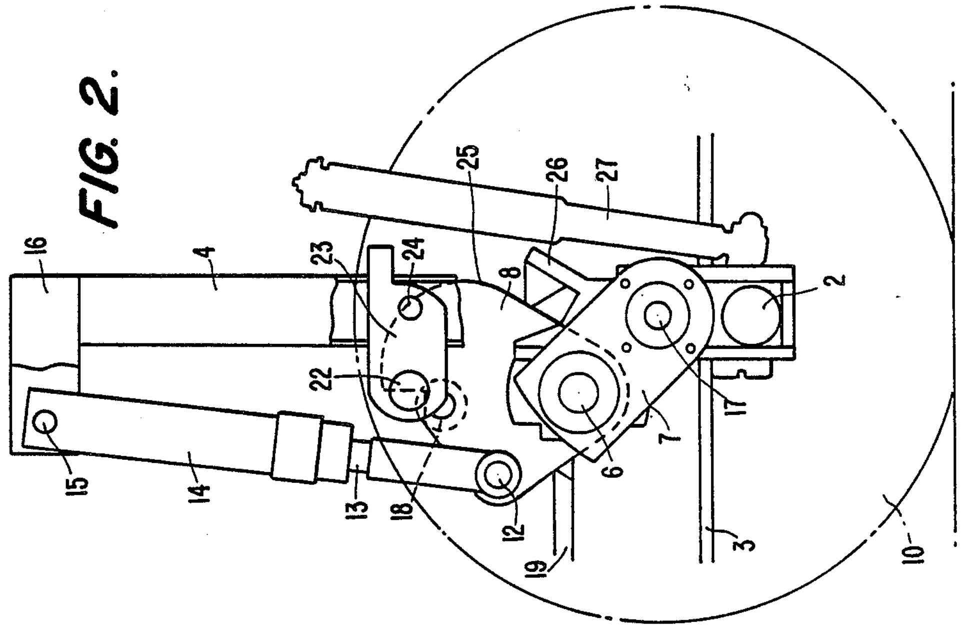
FIGS. 2, 3 and 4 are three sides views, the rear of the vehicle being, respectively, in road position, in the process of being lowered and in the lowered position.
Figure 1:
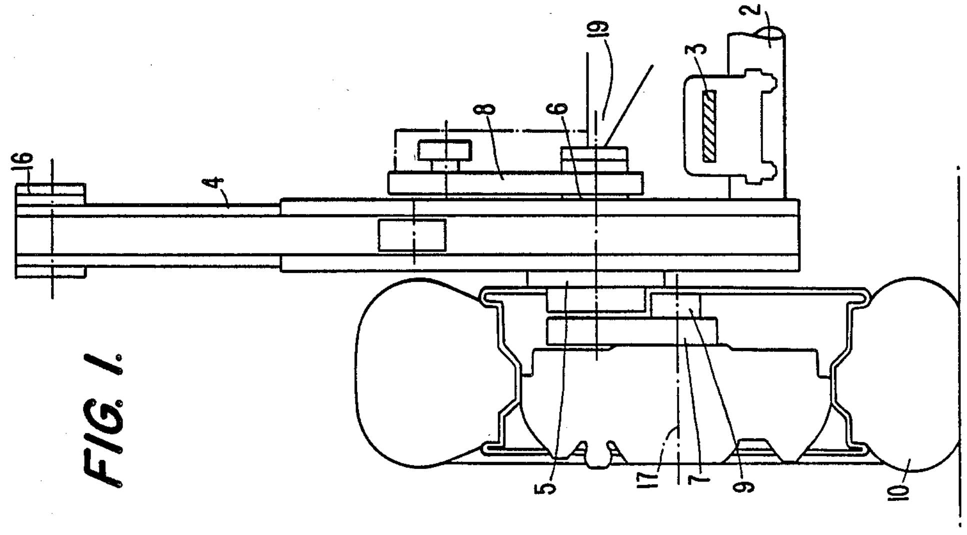
FIG. 1 is a front view of a device mounted at one end of an axle.

The device, represented in the drawings, comprises a rigid axle 2 whose one end is represented associated with suspension blades 3. To the represented end of axle 2 is rigidly fastened an approximately vertical beam 4. This beam 4 is passed through, with insertion of a bearing 5, by a shaft 6 to whose one end is fastened a first arm 7 and to whose other end is fastened a second arm 8. The first arm therefore is located on the side of the outside of the vehicle relative to beam 4, while second arm 8 is located on the side of the inside of the vehicle relative to beam 4.

The first arm carries, in a known way, a steering knuckle and hub unit 9 on which is mounted a wheel 10. For its part, the second arm is equipped with pivot pin 12 of the end of rod 13 of a double-action hydraulic cylinder whose body 14 is pivoted around a pin 15 on a part 16 in the form of a bracket solid with the upper end of vertical beam 14.

It should be noted that axis 17 of the vehicle wheel, the axis of axle 6 and pivot pin 12 of the end of the cylinder rod are approximately aligned in a substantially straight line.

Second arm 8 is also equipped with a roller 18 with an axis parallel to the axis of the axle intended, during movement of the two arms, to rest on frame 19 of the vehicle.

Second arm 8 also exhibits a hook-shaped recess 20 intended, in the road position of the vehicle, for engagement with pin 22, parallel to axle 2, of a latch 23 mounted to pivot around a pin 24 parallel to the axle. Latch 23 can be driven in rotation in the unlocking direction, i.e., clockwise under the action of a hydraulic cylinder, not shown in the drawing.

The part of second arm placed beyond hook 20 is convex and forms a cam 25. Finally, vertical beam 4 is equipped with a rubber stop 26 against which second arm 8 rests when the vehicle is in the high position.

The vehicle finally comprises traditional shock absorbers 27, not belonging to the object of the invention.

Figure 3:
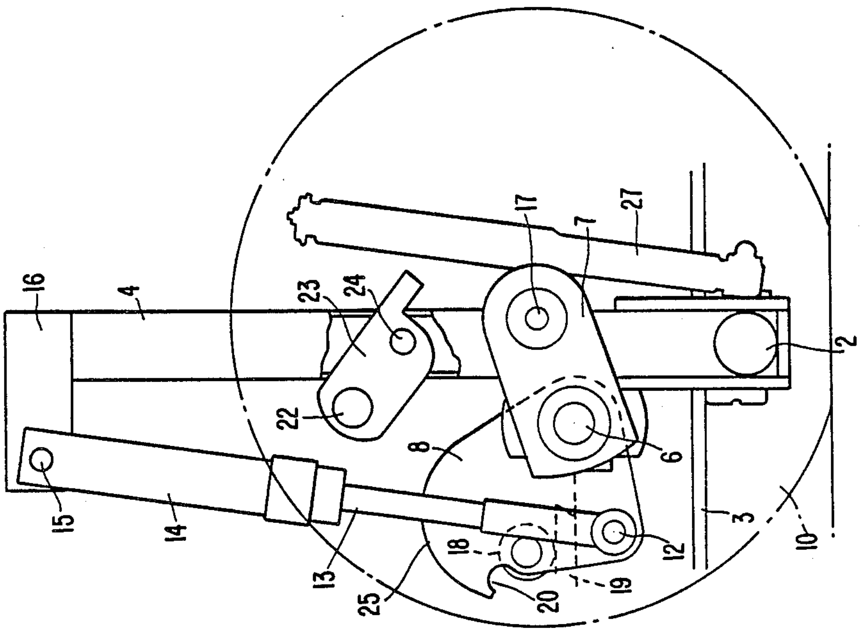

To lower the rear of the vehicle from the position represented in FIG. 2, in a first period, cylinder 14 is to be actuated in the direction of retraction of its rod 13 to free locking pin 22 from the stresses exerted on it. The latch can then be activated into its open position, represented in FIG. 3, and held in this position. Feeding of cylinder 14 is then eliminated and the unit of arms 6 and 7 can pivot counterclockwise under the action of the weight of the vehicle until roller 18, solid with second arm 8, comes to rest on frame 19. This pivoting, around wheel axis 17 with simultaneous pivoting of pin 6 carrying arms 7 and 8 relative to beam 4, has assured the lowering of the frame of the vehicle without applying additional stresses to the suspension.

Figure 4:
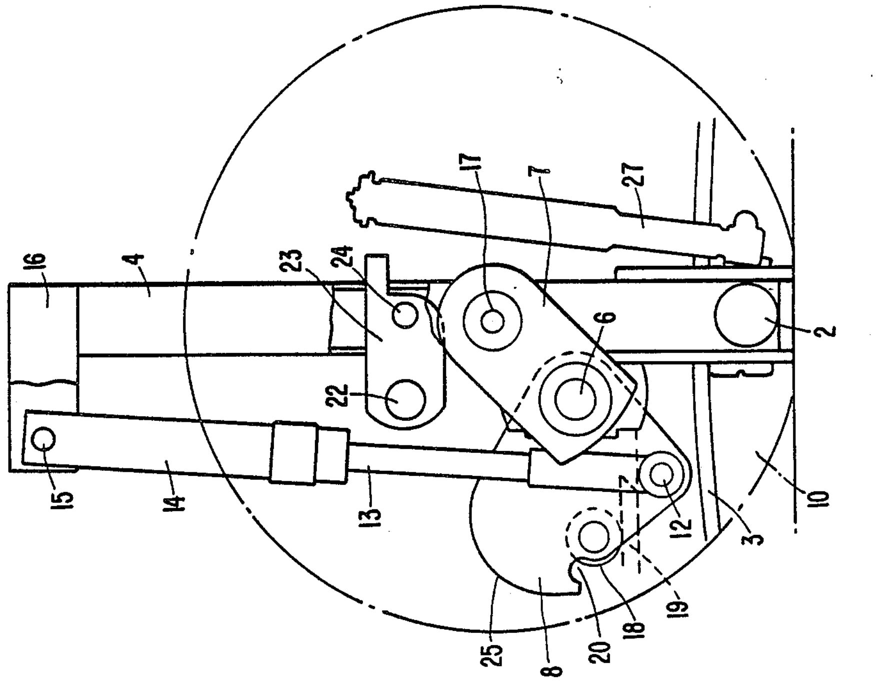

Going from the position represented in FIG. 2, cylinder 14 is then activated in the extension direction of rod 13 to assure continuation of the pivoting movement of arms 7 and 8, this movement being made possible by a compression of the suspension. The wheels are then retracted until the rear of the frame rests on the ground, as shown in FIG. 4, and are held in this position by a check valve inserted in the hydraulic circuit of the cylinder feed (not shown).

For return to the road position, it suffices, for bringing latch 22 into a low position, to activate cylinder 14 in the retraction direction of its rod, which assures the clockwise pivoting of arms 7 and 8 until pin 22 of latch, after guiding along cam-shaped part 25 of second arm 8, comes to be housed in hook-shaped recess 20 of second arm 8 where, after elimination of the hydraulic feed of the cylinder, it is kept by the weight of the vehicle.

As comes out from the above, the invention contributes a great improvement to the existing art, by providing a device allowing the lowering of the rear of the vehicle equipped with a rigid axle with blade suspension, which is completely solid with the rigid axle and which does not change the mechanical stress characteristics.

Of course, the invention is not limited to the sole embodiment of this device, described above, by way of example; rather, it takes in all variant embodiments. Particularly the latch control means could be different and consist, for example, of an electromagnet or a mechanical control.

We claim:

1. A device making it possible to lower a rear end of a road vehicle to bring the rear end to ground level, comprising:

an approximately vertical beam disposed at each end of rear axles of the vehicle, said beam having a lower end fastened to the axle;

a shaft mounted, via a bearing, so as to pass through said beam, oriented parallel to the axle;

a first arm fastened on an outside end of said shaft having a steering knuckle and wheel hub unit mounted thereon;

a second arm fastened to an inside end of said shaft and equipped with locking means for locking the vehicle in a road position, support means supporting the vehicle on a frame in a lowered position and a rod of a cylinder having an end pivoted, a pivot pin connected to said second arm close to an upper end of said beam;

said shaft carrying the two arms and the pivot pin of cylinder on said second arm being offset lengthwise relative to a wheel axis.

2. The device according to claim 1, wherein the wheel axis, said shaft carrying the two arms and the pivot pin of cylinder rod on the second arm are approximately aligned with one another, said shaft carrying the two arms being placed between the pin and the axis.

3. The device according to claim 1, wherein said locking means for locking the second arm consists, in combination, of a hook-shaped recess made in the second arm and open on the side of the pivot pin of the cylinder rod, a latch mounted to pivot on the beam around a pin parallel with the axis of the axle, and a pin having an axis parallel to that of the axle and connected to said latch.

4. The device according to claim 3, further comprising control means for controlling said latch comprises a hydraulic cylinder assuring the pivoting of the latch around the pin in the direction of release of the locking pin from the recess of the second arm.

5. The device according to claim 1, wherein the support means comprises a roller mounted on the second arm, with an axis parallel to the axle, placed behind the pivot pin of the cylinder rod in the direction of rotation of the arms corresponding to the extension of the cylinder rod.

6. The device according to claim 1, wherein an edge of second arm, located behind the hook-shaped recess, in the direction of rotation of the arms corresponding to the extension of the cylinder rod, has a cam-shaped convex profile.

7. The device according to claim 1, further comprising a hydraulic circuit for feeding cylinder is equipped with a check valve for preventing escape of the fluid from an upper chamber of the cylinder when the vehicle frame is in the lowered position.

8. The device according to claim I, wherein each beam is equipped with stop means made of a flexible, damping material such as rubber, on which the second arm rests when the vehicle is in the road position.

* * * * *